Figure 1:
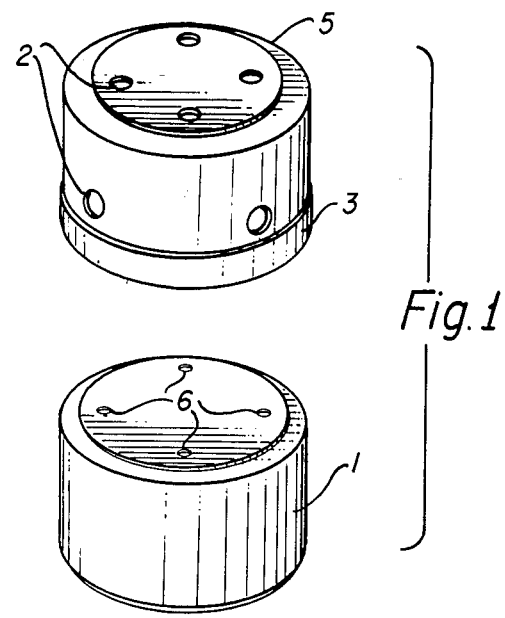

United States Patent [19]

Kelm

[11] Patent Number: 4,640,874
[45] Date of Patent: Feb. 3, 1987

[54] METAL/AIR CELL
[75] Inventor: Roger W. Kelm, New Richmond, Wis.
[73] Assignee: Duracell Inc., Bethel, Conn.
[21] Appl. No.: 759,820
[22] Filed: Jul. 29, 1985
[51] Int. Cl.$^4$ .................. H01M 8/24; H01M 12/04; H01M 2/10
[52] U.S. Cl. .................. 429/27; 429/121; 429/157
[58] Field of Search .............. 429/121, 175, 176, 206, 429/152, 157, 162, 27, 82, 86, 96, 97, 98, 156

[56] References Cited
U.S. PATENT DOCUMENTS

| | | | |
|---|---|---|---|
| 2,482,514 | 9/1949 | Ruben | 429/82 |
| 3,488,698 | 1/1970 | Quich, Jr. | 429/175 X |
| 4,011,368 | 3/1977 | Mabuchi et al. | 429/121 |
| 4,087,595 | 5/1978 | Mallery | 429/157 X |
| 4,184,007 | 1/1980 | Urry | 429/121 X |
| 4,224,385 | 9/1980 | Ciliberti, Jr. et al. | 429/157 X |
| 4,343,869 | 8/1982 | Oltman et al. | 429/162 X |
| 4,394,059 | 7/1983 | Reynolds | 429/121 |
| 4,513,063 | 4/1985 | Field et al. | 429/121 |

FOREIGN PATENT DOCUMENTS 1319780 6/1973 United Kingdom .................. 429/27

Primary Examiner—Donald L. Walton
Attorney, Agent, or Firm—Ronald S. Cornell

[57] ABSTRACT

A button type metal/air cell with a height increasing cap thereon to provide for multiple-cell batteries of varying heights. The cap is placed adjacent the cathode inlet of the cell and is accordingly apertured and preferably also contains a porous absorbent material for leakage prevention but which does not significantly affect air inflow rate. Cells, with protective height adjusting caps, are assembled into multi-cell batteries of varying heights with reduced incidence of leakage.

14 Claims, 2 Drawing Figures

METAL/AIR CELL

The present invention relates to button type metal/air cells and particularly to the construction of varying height batteries and the prevention of leakage from zinc/air cells especially when configured in multi-cell battery assemblies.

The most common structure for metal/air cells such as zinc/air cells is the button type configuration. Such cells are generally constructed with an apertured cup, generally also the cell container, which contains a hydrophobic layer of a material such as polytetrafluoroethylene (PTFE) adjacent the apertures to prevent electrolyte leakage but which permits air inflow. The apertures in the cup permit the influx of the cathode depolarizing air. The cup or container also contains the catalytic cathode and thereby comprises the positive terminal for the cell. A cell top which closes the cell encloses the zinc anode and comprises the negative terminal for the cell. Since the active cathode material is constantly replenishible such cells have much larger capacities than equivalent cells of other types such as alkaline manganese dioxide or mercuric oxide cells and are generally of small size. However, because of such small size it has been difficult to construct multi-cell batteries of standard sizes and voltages from such cells. In addition, the use of spacers to build up cell sizes is not desirable since they tend to block access to the apertures required for air influx. In addition, metal/air cells such as zinc/air cells are somewhat prone to electrolyte leakage since the apertures in such cells, which are necessary for air ingress, also may serve as passageways for undesirable electrolyte egress. Electrolyte leakage may be a problem in such cells at the end of discharge particularly in cells, within batteries, which have been overdischarged. The use of air permeable hydrophobic materials such as PTFE to block the passageways and to prevent electrolyte leakage, while permitting inflow of the depolarizing air, has generally been effective in preventing such leakage. However, over long periods of storage time and at the end of discharge, leakage may occur in such cells and is a problem to be avoided.

It is an object of the present invention to provide a means for permitting the construction of varying height multi-cell batteries from button cell type metal air cells.

It is a further object of the present invention to provide a cell structure which substantially retards external electrolyte leakage without significantly impairing the operation of metal/air depolarized cells.

It is a further object of the present invention to provide such configured cells in multi-cell batteries in which leakage is substantially retarded.

Figure 2:
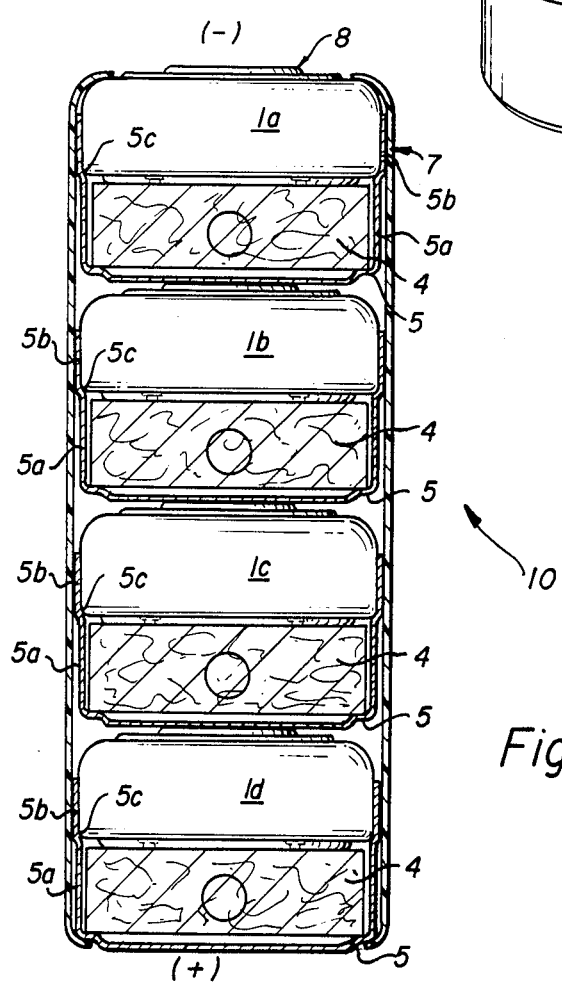

These and other objects, features and advantages of the present invention will become more evident from the following discussion as well as the drawings in which:

FIG. 1 is an isometric view of a cell of the present invention having a height increasing cathode cap being placed thereon; and FIG. 2 is a sectioned elevation view of a multi-cell battery with each of the cells having a cathode cap having leakage protection absorbent material contained therein.

Generally the present invention comprises a metal/air cell, particularly having a button type configuration, comprising a metal, particularly zinc, anode, a catalytic air depolarizing cathode and a fluid electrolyte, particularly an aqueous alkaline KOH solution, contained within a closed cylindrical cell container of a predetermined height with the cell container being apertured in a position thereof adjacent said cathode to permit ambient air to enter said cell. A closed ended cylindrical cap is placed thereon to increase the predetermined height to a larger size whereby existing cells may be used to construct multi-cell batteries of varying heights. The cap is preferably placed on the cell in a position adjacent the apertures required in such cell for cathode depolarizing air ingress. The cap, in such position, is in itself apertured in either or both the end and side walls thereof and air ingress is not significantly impeded thereby. In addition, the cathode-adjacent cap preferably contains an air permeable electrolyte absorbent material of sufficient volume to effectively immobilize or neutralize corrosive leaking electrolyte before it leaves the cell container. In the cells of the present invention the cathode cap does not form part of the sealed cell structure but is an added member to the completed cell. The cathode cap is preferably comprised of thin metal in order to permit the use thereof as a terminal for the cathode. However, if the cathode is electrically accessible outside of the cathode cap, such cap may be made of a variety of materials such as molded or porous plastic, heat shrink material, a paper product or a combination of materials.

The cathode cap should peripherally conform to the shape of the cathode housing to which it is juxtaposed and for utilization efficiency should be thin but structurally strong. The cap overlaps at least a portion of the side walls of the cell and thereby preferably peripherally completely surrounds the cell container. the diameter of the cap corresponds to the desired diameter of the finished cell. The height of the cell container with the cap height extension is that of the desired cell in a multi-cell battery. A tight press fit of the cathode cap on the cell is a preferred economic method of affixation with the structural configuration of the cap and the cell being utilized to consistently provide completed capped cells with uniform dimensions. The inside diameter of the cap at its open and should be at least equal to the outer diameter of the cell container to effect proper positioning fixed placement. If desired, the caps may be peripherally welded to the cells or adhered by a conductive adhesive such as conductive epoxy. It is desirable that the cathode cap be stepped to a smaller diameter, than the cell, at its closed end. This configuration ensures a positive seating of the cathode cap step on the cell container to provide the requisite height (the sum of the cell container height and the distance from the step to the closed end). The porous absorbent material is disposed within such smaller diameter area in a position adjacent the air holes of the cell.

In a metal/air cell wherein an electrochemical material source is external to the cell, utilization of a cap on the cathode presents a problem with respect to cell utility since the cathode cap substantially covers the apertures of the cell which permit the inflow of depolarizing air. Accordingly, such cap must be apertured to provide a similar rate of air ingress. There is however a further problem with respect to air inflow and cell capability. Air inflow, through the cathode cap to the cell apertures and the cell cathode, is also impeded by the absorbent material contained in the cap adjacent the cell apertures. It is therefore preferred that such cap apertures be larger and/or greater in number than the apertures of the cell itself in order to maintain an air flow rate generally equivalent to that of the uncapped cell. In addition, the type of absorbent material and its configuration within the cathode cap should be of sufficient porosity to permit substantially unimpeded or only slightly impeded air inflow rate in conjunction with the enlarged or more numerous cathode cap apertures.

The absorbent material is preferably a superabsorbent polymer type for greater volumetric efficiency in absorbing leaking electrolyte. However such material must be of a non-desiccant type in order that it not affect the moisture content of the air depolarized cell during sealed storage. Examples of suitable absorbent materials include starch graft copolymers, carboxymethyl cellulose and other materials generally utilized with cell electrolytes for the gelling or the absorbency thereof. Since air depolarized cells cannot operate without access of external depolarizing air to the cell cathode, the absorbent material must be air permeable to an extent whereby cell performance is not degraded. It is accordingly preferred that the absorbent material be contained on or in a porous substrate and placed within the cell cap in a position between the apertures of the cell and the apertures of the cap. An example of such absorbent material comprises absorbent powders, such as starch graft copolymers which are commercially available (e.g. Waterlock Laminates from Grain Processing Corp.) as laminates on layer material such as tissue paper. Fibrous absorbers, such as cotton known by the trademark Webril, while not as absorbent as the superabsorbers, nevertheless provide the advantage of permitting greater amounts of air permeation therethrough. Other absorbent materials include cotton linters from Hercules Corp., absorbent polymer based sheets from Pellon Co. and filter papers such as those available from Whatman Co. The amount of absorbent material to be utilized in dependent upon its absorbency and generally such amount should be sufficient to absorb at least 10% of the electrolyte contained within the cell in order to ensure that there will be no external leakage. A preferred form of the absorbent material comprises disks, cut from a sheet, which are sized to fit within the cathode cap. Loose particle or powder form absorbents must be of a size which will not spill out of the air holes in the cap or unduly clog the air holes of the cell.

The dimensions of the cap should generally conform to that of the cell and the size of the desired cell with cap. Thus, the internal diameter of the cathode cap should be about the same as the external diameter of the cell to ensure a proper frictional fit therebetween. If adhesives, such as conductive epoxies, are utilized, the cathode cap should be sized to accommodate the adhesive therebetween. The height of the cap should be sufficient to contain the absorbent material, and provide for sufficiently large or numerous air ingress apertures with a sufficient holding overlap with the cell container whereby it is not too readily dislodgeable. The height of the cathode cap which is to extend beyond the cell, e.g. the stepped portion of the cathode cap, may be adjusted for the desired height of the complete cell such as for use in a standard size battery. The utilization of a smaller diameter step to ensure seating on the cell at the proper height is preferred.

With specific reference to the drawings, FIG. 1 depicts a button type zinc/air cell 1 having apertures 6 therein for permitting access of depolarizing air to the cell cathode contained therein beneath the apertures. Cathode cap 5 is sized to be press fit over the cathode end of cell 1 thereby covering apertures 6. Apertures 2 in the cathode cap 5 are shown as being larger than apertures 6 and are sized to maintain an equivalent air flow rate to the cell cathode since the air flow is impeded by an absorbent contained within the cathode cap in the area between apertures 2 and 6.

The absorbent material 4 is more clearly seen in FIG. 2 wherein a stack of four button cells 1a–d is shown forming battery 10. Cathode cap 5 of each of the cells is comprised of a thin metallic cup which overlaps the sides of the respective cell to provide a frictional fit. The cells 1a–d are arranged in series within crimped cylindrical sleeve 7 with cathode cap 5 of cells 1a–c providing the electrical series interconnection between such cells and the anode terminals 8 of the abuttingly adjacent cells 1b–d respectively. Cathode cap 5 of cell 1d and anode terminal 8 of cell 1a provide the external terminal contact points. Cathode cap 5 is of stepped configuration with the section 5a thereof being of reduced diameter compared to section 5b which overlaps the sides of the respective cells. The finished cell height, as required, is that of the heights of section 5a and that of the original cell. The step 5c, with the reduction in diameter, provides for positive seating of the cathode cap on the respective cells to a uniform height as required. Cylindrical sleeve 7 snugly encloses section 5b of the cathode caps 5 with section 5a of the cathode caps 5 being spaced from the walls of the sleeve. Accordingly, air access is provided to the apertures of the walls of cap 5 for ingress to each of the cell cathodes if the cathode cap has the optional side wall apertures as shown in FIG. 1.

In order to more clearly disclose the efficacy of the present invention the following examples are presented. It is understood that such examples are for illustrative purposes only and that details contained therein are not to be construed as limitations on the present invention. Unless otherwise indicated all parts are parts by weight.

EXAMPLE 1

A button type cell having a diameter of 0.61" (1.55 cm) and a height of 0.24" (0.61 cm) contains a zinc anode and a catalytic air depolarized cathode. The cell contains an aqueous 30% KOH electrolyte. Four apertures in the end wall of the cell container, at its cathode side as shown in FIG. 1, are each of 0.018" (0.046 cm) diameter to permit access of air to the catalytic cathode through a hydrophobic PTFE layer. A closed ended cylindrical stepped cathode cap of 10 mil (0.025 cm) thick nickel plated steel, having the dimensions of 0.325" (0.83 cm) total height, a diameter of 0.62" (1.57 cm) at its open end, and 0.52" (1.32 cm) at its closed end is press fitted on the cell with an overlap of the cap and the cell of 0.205" (0.52 cm) to the stepped portion of the cap. Four air holes are formed in the end of the cap with each having a diameter of 0.04" (0.10 cm) in a configuration as shown in FIG. 1. An absorbent disk of Webril cotton with a diameter substantially the same as that of the internal diameter of the cap at its closed end (0.618" (1.57 cm) is seated within the cap adjacent the air holes thereof. The thickness of the Webril cotton disk is 0.015" (0.038 cm) with an electrolyte absorbency capability of 20 times its weight. The weight of the cotton disk is about 0.025 grams with an absorbency capability of 0.5 grams which is more than adequate to absorb all of the electrolyte in a cell. The capacity of the cell is 950 mAhrs with a limiting current of 30 mA.

EXAMPLE 2

Four cells made in accordance with Example 1 are stacked in a series arranged 5.6 volt battery, as shown in FIG. 2, with the dimensions of about a 0.662" (1.68 cm) diameter and a height of about 1.78" (4.52 cm). The battery provides about 35 hours of service to a 3.6 volt cutoff with a 200 ohm load. With the stacking of the cells there is a reduction of current carrying capability to about 25 mA. However, most of the application for zinc/air cells require from about 4 to 6 mA current carrying capability.

The cell of Example 1 and the cells and battery of Example 2 exhibit no external leakage even after complete discharge.

It is understood that the above examples are for illustrative purposes and that changes may be made in cell components and configuration without departing from the scope of the present invention as defined in the following claims.

What is claimed is:

1. A metal/air cell comprising a metal anode, a catalytic air depolarizing cathode and a fluid electrolyte contained within a closed cylindrical cell container of a predetermined height, wherein said cell container is apertured in a position thereof adjacent said cathode to permit ambient air to enter said cell, characterized in that a cylindrical apertured cap is engagingly positioned on said cell container and covers the apertured portion thereof whereby the height of said cell is increased thereby to a required height and ambient air enters said cell through said cap.

2. The metal/air cell of claim 1 wherein said metal is zinc.

3. The metal/air cell of claim 2 wherein said closed cylindrical cell container is of a button type cell configuration and the cylindrical apertured cap includes a portion which completely surrounds the periphery of the cell.

4. The metal/air cell of claim 3 wherein said closed cylindrical cell container is apertured in an end wall thereof and said cylindrical cap is seated on said end wall to effect said increase in height.

5. The metal/air cell of claim 4 wherein said cylindrical cap contains a porous air permeable absorbent material in an amount sufficient to absorb or neutralize at least 10% by weight of said electrolyte.

6. The cell of claim 5 wherein said fluid electrolyte is comprised of an aqueous KOH solution.

7. The metal/air cell of claim 5 wherein said absorbent material is a non-desiccant material selected from the group consisting of starch graft copolymers, carboxymethyl cellulose, cotton linters, absorbent polymers and filter paper.

8. The metal/air cell of claim 5 wherein said absorbent material is a non-desiccant powder material on an air permeable substrate.

9. The metal/air cell of claim 5 wherein the apertures of said cylindrical cap are larger than those of the cell container whereby said ambient air enters the cell at substantially the same rate as it enters the cell without said cap with contained absorbent material.

10. The metal/air cell of claim 5 wherein the apertures of said cylindrical cap are more numerous than those of the cell container whereby said ambient air enters the cell at substantially the same rate as enters the cell without said cap with contained absorbent material.

11. The metal/air cell of claim 5 wherein said cylindrical cap is comprised of a conductive metal and functions as the external positive terminal of said cell.

12. The metal/air cell of claim 4 wherein said cylindrical cap comprises a stepped cylinder with an open end of a diameter at least equal to the external diameter of said cell container whereby said open end is fittingly positioned thereby on said cell container and wherein said cap further comprises a circumferential inwardly directed step to a diameter less than that of said cell container whereby said step is seated on said cell container, with said step being located on said cap such that the sum of the distance from said step to said closed end and the height of said cell container is equal to said required height.

13. A battery made with at least two cells of claim 1.

14. The battery of claim 13 wherein said cells are contained within an air permeable sleeve and are stacked in a series arrangement.

* * * * *